United States Patent

Cole, Jr. et al.

[11] 3,984,343
[45] Oct. 5, 1976

[54] LIQUID CRYSTAL MIXTURES WITH SELECTIVELY VARIABLE DIELECTRIC ANISOTROPIES

[75] Inventors: Herbert S. Cole, Jr., Scotia; Richard A. Kashnow, Schenectady, both of N.Y.

[73] Assignee: General Electric Company, Schenectady, N.Y.

[22] Filed: May 1, 1974

[21] Appl. No.: 465,825

Related U.S. Application Data

[62] Division of Ser. No. 293,328, Sept. 29, 1972, abandoned.

[52] U.S. Cl. .......................... 252/299; 350/160 LC
[51] Int. Cl.² ...................... C09K 3/34; C02F 1/13
[58] Field of Search ................ 252/408 LC, 299; 350/160 LC

[56] References Cited
UNITED STATES PATENTS

| | | | |
|---|---|---|---|
| 3,322,485 | 5/1967 | Williams | 252/299 |
| 3,499,702 | 12/1967 | Goldmacher et al. | 252/299 |
| 3,650,603 | 3/1972 | Heilmeier et al. | 252/408 LC |
| 3,781,088 | 12/1973 | Tsukamoto et al. | 252/408 LC |
| 3,815,972 | 6/1974 | Hsieh | 252/408 LC |
| 3,891,307 | 6/1975 | Tsukamoto et al. | 350/160 LC |

*Primary Examiner*—Benjamin R. Padgett
*Assistant Examiner*—T. S. Gron
*Attorney, Agent, or Firm*—Geoffrey H. Krauss; Joseph T. Cohen; Jerome C. Squillaro

[57] ABSTRACT

Nematic liquid crystal mixtures characterized by a selectively variable anisotropy and a mesophase including room temperatures are described. The mixtures comprise a negative dielectric anisotropic nematic liquid crystal material and a small percentage of a positive dielectric anisotropic nematic liquid crystal present in an amount effective to increase the dielectric anisotropy of the mixture. The further addition of a small percentage of a cholesteric material produces a mixture characterized by a helicoidal structure having a pitch greater than the wavelength of visible light and a cholesteric-nematic transition phenomenon induced by an electric field.

5 Claims, 4 Drawing Figures

LIQUID CRYSTAL MIXTURES WITH SELECTIVELY VARIABLE DIELECTRIC ANISOTROPIES

This is a division of application Ser. No. 293,328, filed Sept. 29, 1972, now abandoned.

The present invention relates to electro-optic effect devices and compositions and more particularly to liquid crystal devices and compositions.

Liquid crystal display devices generally utilize the dynamic scattering properties of a nematic liquid crystal composition to produce various display devices. These display devices rely on an orientational ordering of molecular axes in a quiescent condition to produce a substantially transparent condition and a partially randomized alignment of these molecules in an activated condition to produce a substantially opaque or frosted condition, thereby producing a contrasting display. The molecular alignment in the quiescent condition is generally along an axis parallel to the substrate supporting a thin layer of the nematic liquid crystal material or along an axis perpendicular thereto. The former alignment is generally referred to as a homogeneous boundary condition, whereas the latter is referred to as a homeotropic boundary condition. Generally these display devices employ negative dielectric anisotropic nematic liquid crystal materials.

Cholesteric liquid crystal materials of positive dielectric anisotropy, another class of liquid crystal compositions, can be configured to scatter light in the quiescent state and become substantially transparent by the application of a moderate field. This mode of operation is distinguishable from the class of effects, such as dynamic scattering, which occur in nematic materials having negative dielectric anisotropy. Microscopic observation of the light scattering state has led to the conclusion that the cholesteric material assumes a helicoidal structure and that the application of an electric field "unwinds" the helix and produces a homeotropic quasi nematic state. This transition in cholesteric materials is described by Wysocki et al, Physical Review Letters, Vol. 20, No. 19, p. 124, May 6, 1968.

The materials described by Wysocki et al are "pure" cholesterics with net positive dielectric anisotropy. Such materials are characterized by a tendency for helical ordering with a helix pitch usually on the order of 0.5 microns, the wavelength of visible light. Liquid crystal display devices constructed with these cholesteric materials unfortunately produce an iridescent optical effect in their quiescent state, that is, the light scattering is dispersive. Also, since the threshold field required to produce the quasi-nematic condition is inversely proportional to the helical pitch, the voltages required to "unwind" the helical structure are very large, of the order of 100 volts r.m.s. for sample thicknesses of the order of 30 microns.

It is therefore an object of this invention to provide a liquid crystal mixture which exhibits a light scattering quiescent state and a homeotropic quasi-nematic state upon the application of a moderate electric field.

It is a further object of this invention to provide a cholesteric liquid crystal mixture having a positive dielectric anisotropy and a helical pitch which renders light scattering non-dispersive.

It is still another object of this invention to provide a nematic liquid crystal mixture having a positive dielectric anisotropy and a mesophase which includes room temperatures.

It is yet another object of this invention to provide a nematic liquid crystal mixture characterized by a room temperature mesophase and a dielectric anisotropy which is selectively variable from a negative value to a positive value.

Briefly, these and other objects of our invention are achieved in accord with one embodiment thereof wherein a nematic liquid crystal mixture characterized by a room temperature mesophase and either a negative or a positive dielectric anisotropy is formed by the addition of a negative dielectric anisotropic nematic liquid crystal material and a small percentage of a positive dielectric anisotropic nematic liquid crystal material having a mesophase above room temperature. The positive dielectric anisotropic nematic liquid crystal material increases the dielectric anisotropy and produces a positive dielectric anisotropic nematic liquid crystal material with a mesophase including room temperatures. We have found that the dielectric anisotropy increases approximately linearly from approximately −0.5 to 6.0 as the concentration of the positive dielectric anisotropic material increases from 0 to approximately 20% by weight.

In further accord with our invention, we have discovered that the further addition of from approximately 3 to 10% by weight of a cholesteric liquid crystal material to the foregoing selectively variable dielectric anisotropic materials produces a mixture having a cholesteric-nematic transition phenomenon induced by an electric field. This mixture is characterized by a helicoidal structure having a pitch greater than the wavelength of visible light and hence scatters incident visible light with an angular distribution which is substantially independent of the wavelength of the visible light. These mixtures are further characterized by a broad temperature range over which the mesophase characteristic exists.

A better understanding of our invention as well as other objects and further advantages thereof will become more apparent to those skilled in the art from the following detailed description taken in connection with the accompanying drawings in which.

In accord with one embodiment of our invention, we have discovered novel nematic liquid crystal mixtures having a selectively variable dielectric anisotropy and a mesophase including room temperatures. More specifically, we have found that by combining a negative dielectric anisotropic-nematic liquid crystal material with a positive dielectric anisotropic material having a mesophase substantially above room temperature, a mixture is produced which has a selectively variable dielectric anisotropy which varies with concentration of the positive dielectric anisotropic material.

Figure 1:
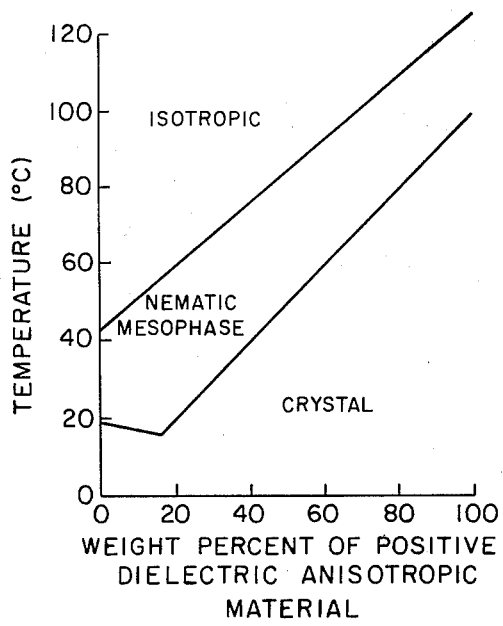
FIG. 1 is a phase diagram of a liquid crystal composition in accord with one embodiment of our invention.

FIG. 1, by way of example, illustrates the phase diagram of a nematic liquid crystal composition and the nematic mesophase characteristic as the percentage of a positive dielectric anisotropic material is increased.

More specifically, with 0% of a positive dielectric anisotropic material, the nematic mesophase is between approximately 20° and 40°C. As the percentage of the positive dielectric anisotropic material increases, the temperature range of the mesophase increases in the direction of the positive dielectric anisotropic material. More importantly, however, the dielectric anisotropy of the nematic mixture varies with the concentration of the positive dielectric anisotropic material.

Figure 2:
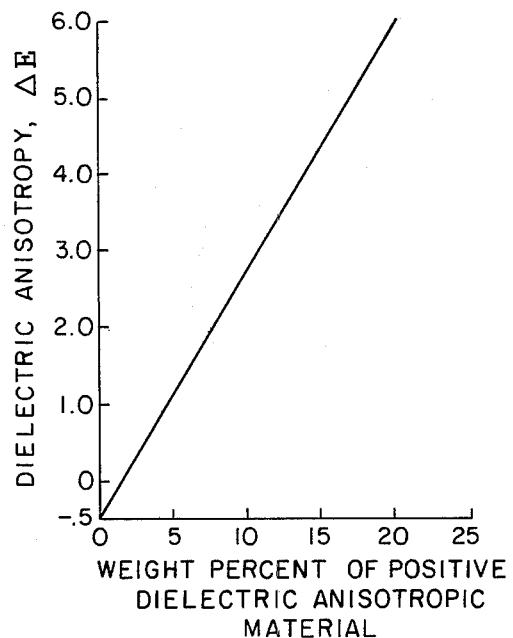
FIG. 2 is plot of the variation in dielectric anisotropy as a function of the percentage of a cyano-Schiff base.

In particular, as illustrated in FIG. 2, the dielectric anisotropy varies from a negative value where no positive dielectric anisotropic material is present to a value of + 6 as the concentration of the positive dielectric anisotropic material increases to approximately 20%. Within a range of concentrations, i.e., approximately 2 and 20% by weight, the dielectric anisotropy of the composition is positive and the nematic mesophase includes room temperatures, i.e., at least 20° – 40°C.

We have further found that the addition of from approximately 3 to 10% by weight of a cholesteric liquid crystal material to this positive dielectric anisotropic nematic liquid crystal mixture exhibits an electro-optic effect in which a thin layer of the nematic mixture scatters light in the absence of an electric field and under the influence of an electric field, of approximately $10^6$ volts per meter, appears substantially transparent. As pointed out above, this mode of operation is distinguishable from the class of effects, such as dynamic scattering, which occur in nematic materials having negative dielectric anisotropy. Furthermore, these novel mixtures are characterized by a helical ordering having a helix pitch in excess of the wavelength of visible light. Hence, the undesirable characteristics of the pure cholesteric compositions described by Wysocki et al are overcome. More specifically, the novel nematic liquid crystal mixture in accord with our invention does not exhibit an iridescent effect since the light scattering in the quiescent state is non-dispersive. Furthermore, since the electric field threshold is substantially inversely proportional to the helical pitch, the voltages required to "unwind" the helical structure are substantially less than those required for the pure cholesterics. This characteristic of our invention will be described more fully below.

In general, we have found that room temperature liquid crystal mixtures with positive dielectric anisotropy may be formed by combining a nematic liquid crystal material of negative dielectric anisotropy and a mesophase including or below room temperature with a positive dielectric anisotropy-nematic material having a mesophase above room temperature. For example, n-(p-methoxybenzylidene)-p-butylaniline (MBBA), possesses a negative dielectric anisotropy and a mesophase which includes room temperature. By combining MBBA with a positive dielectric anisotropic material, such as n-(p-Ethoxy-benzylidene)-amino benzonitrile, PEBAB, a mixture having a selectively variable dielectric anisotropy and a mesophase including room temperature is provided. For example, a 20/80 PEBAB/MBBA mixture exhibits a positive dielectric anisotropy and a room temperature nematic mesophase. In general, we have found that mixtures comprising between 2 and 20% by weight of a positive dielectric anisotropic material and 80 and 98% by weight of a negative dielectric anisotropic material exhibit the foregoing desirable characteristics, namely a positive dielectric anisotropy and a room temperature mesophase. When PEBAB, a cyano-Schiff base, is present in a concentration less than approximately two percent by weight, the dielectric anisotropy of the mixture ranges between approximately −0.5 and 0, where the negative nematic liquid crystal material is MBBA.

Those skilled in the art can appreciate that numerous positive and negative dielectric anisotropic nematic liquid crystal materials may be employed in the practice of our invention. For example, U.S. Pat. Nos. 3,322,485 - Williams and 3,499,702 - Goldmacher et al describe numerous materials which are useful. Still other materials may be used and the foregoing listing is merely by way of illustration and not limitation.

Figure 3:
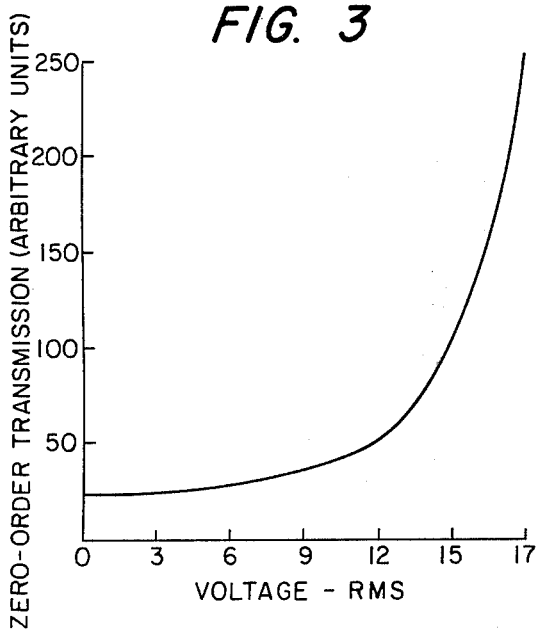
FIG. 3 illustrates a typical threshold characteristic for a liquid crystal composition including a small percentage of a cholesteric material.

We have also discovered that the addition of a small amount of a cholesteric liquid crystal material to the above-described mixtures produces a mixture having a cholesteric-nematic transition phenomenon. Additionally, we have found that the threshold voltage at which the mixture becomes substantially transparent is significantly reduced when compared with pure cholesteric compositions. More specifically, as pointed out above, Wysocki's pure cholesteric mixtures exhibited threshold voltages of approximately 100 volts r.m.s. for sample thickness of approximately 30 microns. In contradistinction, our nematic-cholesteric mixtures, including only a small percentage of a cholesteric material, exhibit threshold voltages of approximately 15 volts r.m.s. for the same thicknesses. FIG. 3 is a typical voltage characteristic for a nematic-cholesteric liquid crystal mixture of positive dielectric anisotropy including 3% by weight of a cholesteric material, such as cholesteryl oleyl carbonate (COC).

We have also discovered that this threshold voltage is frequency independent up to at least 10 kHz. This is unlike the dynamic scattering of negative dielectric anisotropy liquid crystal materials. This frequency independence appears to result from the fact that the helical "unwinding" of the light scattering state with our mixture is predominantly the result of dielectric alignment torques rather than conduction-induced torques, a characteristic of negative dielectric anisotropy materials.

We have also found that the threshold voltage characteristic is substantially directly proportional to the cholesteric concentration and inversely proportional to the concentration of the positive dielectric nematic liquid crystal material. Further, we have found that the threshold voltage is substantially independent of the resistivity of the mixture but can be altered by varying the sample thickness. In fact, liquid crystal display devices constructed with the above-described mixtures exhibit a threshold characteristic which is electric field dependent rather than voltage dependent. Hence, display devices constructed with mixtures formulated in accord with our invention are truly field effect devices rather than voltage effect devices. This results from the fact that the mixture exhibits a helicoidal structure and "unwinding" the helix is proportional to the electric field since boundary effects are small compared to voltage effects on the helix pitch.

In practicing our invention, numerous cholesteric liquid crystal materials and derivatives from reactions of cholesteric and inorganic acids may be used. A typical listing of such materials is found in U.S. Pat. No. 3,642,348 of Wysocki et al.

Figure 4:
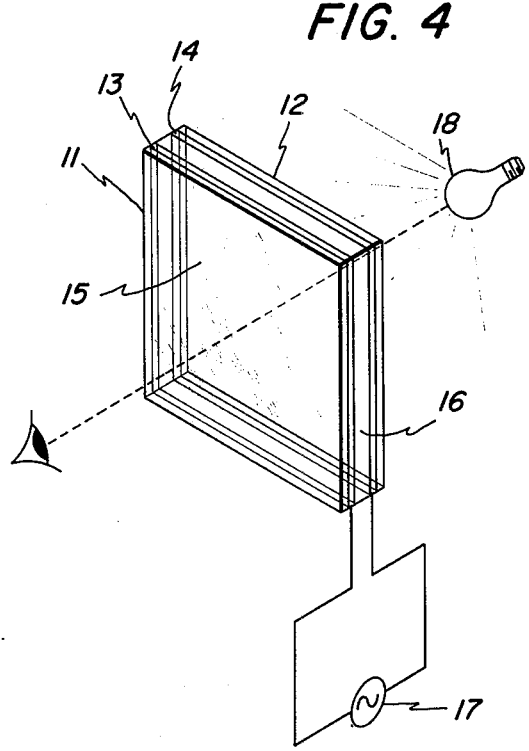
FIG. 4 illustrates a typical liquid crystal display device useful in the practice of our invention.

FIG. 4, by way of example, illustrates a typical liquid crystal display device comprising a pair of parallel glass substrates 11 and 12 with conductive coatings 13 and 14 respectively, on the opposing surfaces of the glass substrates. The conductive coatings 13 and 14 may be etched in suitable patterns to form the desired display in a liquid crystal material 15 contained between the glass substrates by a suitable gasket 16. An electric field is applied to the liquid crystal material 15 from the voltage source 17, connected in the manner illustrated. For transmissive liquid crystal displays, a light source 18 is positioned on one side of the display and viewed from the other.

So that those skilled in the art can better appreciate our invention, the following examples are given by way of illustration and not limitation. In all the examples, parts are by weight and temperatures are in degrees Celsius unless otherwise stated.

EXAMPLE 1

Eight grams of MBBA are mixed with 2 grams of PEBAB and warmed to approximately 80°C. until the mixture is completely miscible, approximately 5 minutes. The resultant mixture is then cooled to room temperature and is found to have a nematic mesophase between approximately 18° and 54°C. The net dielectric anisotropy is positive having a magnitude of approximately 6.0.

EXAMPLE 2

The mixture of Example 1 is used in a liquid crystal display cell similar to that illustrated in FIG. 4. The conductive coatings on the glass plates are rubbed in a uniform direction and then placed at 90° to each other. The edges of the display are sealed and the space therebetween filled with the nematic mixture of Example 1. The display device behaves as a "twisted nematic" such that between crossed polarizers there is transmission in the unactivated state and extinction when a voltage of approximately 10 volts is applied to the conductive plates.

EXAMPLE 3

Five percent by weight of cholesteryl nonanoate is mixed with the nematic formulation of Example 1 by warming the mixture to 80° for approximately 5 minutes. The resultant mixture is cooled and placed between two tin oxide coated glass plates separated by approximately three-quarters of a mil. The sample appears transparent in the absence of an applied voltage and with few volts applied to the conductive plates, the display exhibits a focal conic scattering state with a zero order transmission of approximately 10 percent. As the voltage is increased above the threshold, approximately 33 volts r.m.s., the zero order transmission increases to approximately 75 percent. After a 40 volt excitation pulse of 300 milliseconds is removed from the display, the display abruptly returns to the focal conic light scattering state in approximately 80 milliseconds. As the applied voltage is increased, the rise time becomes shorter, i.e., at 70 volts r.m.s., the rise time is approximately 80 milliseconds, whereas the decay time is independent of the applied potential.

EXAMPLE 4

The nematic mixture of Example 1 is mixed with five percent by weight of cholesteryl erucate and warmed to approximately 80°C. for 5 minutes. This mixture, when used in the manner as described in Example 3, exhibits a threshold voltage for the cholesteric to nematic transition phase of approximately 20 volts.

EXAMPLE 5

The nematic mixture of Example 1 is mixed with five percent by weight of cholesteryl oleyl carbonate and warmed to 80°C. for approximately 5 minutes. This mixture, when used as described in Example 3, exhibits a theshold voltage for the cholesteric to nematic transistion phase of approximately 25 volts.

EXAMPLE 6

9.5 grams of MBBA are mixed with 0.5 grams of PEBAB and warmed for 5 minutes at 80°C. The resulting nematic mixture has a mesophase temperature range of between 19° and 45°C. The anisotropy is positive and equal to approximately 1.0. This mixture is then used as described in Example 2.

EXAMPLE 7

Nine grams of MBBA are mixed with one gram of p-[p-(methoxybenzylidene)-amino] benzonitrile and the mixture is warmed to 100°C. for 5 minutes. The resultant mixture has a positive dielectric anisotropy and is used as described in Example 2.

EXAMPLE 8

Ten grams of Merck Phase V is mixed with 0.2 grams of PEBAB and the mixture warmed to 100°C. for 5 minutes. The resulting mixture has a positive dielectric anisotropy and a nematic mesophase between −5°C. and 73°C. The mixture is used as described in Example 2.

Although the above examples have shown various modifications and variations of our invention, it is obvious that still other modifications and variations are possible and will be readily recognized by those skilled in the art. For example, other configurations for display devices are possible. Also, both reflective and transmissive modes of operation may be employed for display purposes, if desired. It is therefore to be understood that changes may be made in the particular embodiments of the invention described which fall within the full intended scope of the invention as defined by the appended claims.

What we claim as new and desire to secure by Letters Patent of the United States is:

1. A liquid crystal mixture exhibiting light scattering in a field free condition and substantial transparency in a field applied condition, said mixture comprising:
   a negative dielectric anisotropic nematic liquid crystal material consisting of n-(p-methoxybenzylidene)-p-butylaniline(MBBA);
   a positive dielectric anisotropic nematic liquid crystal material selected from the group consisting of p-[p-(methoxybenzylidene)-amino] benzonitrile and n-(p-ethoxy-benzylidene)-amino benzonitrile, said material being present in an effective amount to increase in a positive sense the dielectric anisotropy of said mixture to a value above zero; and
   a cholesteric liquid crystal, said cholesteric liquid crystal present in a concentration between approximately 2 and 10% by weight.

2. The liquid crystal mixture of claim 1 wherein said positive dielectric anisotropic material is present in a concentration between approximately two and twenty percent by weight.

3. The liquid crystal mixture of claim 2 wherein said composition is further characterized by a pitch greater than the wavelength of visible light.

4. The liquid crystal mixture of claim 1 wherein a thin layer of said composition is characterized by a helicoidal structure having a pitch which causes visible light incident on said layer to be scattered with an angular distribution which is substantially independent of the wavelength of the visible light.

5. The liquid crystal mixture of claim 4 wherein said thin layer is rendered substantially transparent when an electric field of approximately $10^6$ volts/meter is applied to said layer.

* * * * *